United States Patent [19]

Snook

[11] Patent Number: 4,481,774
[45] Date of Patent: Nov. 13, 1984

[54] SOLAR CANOPY AND SOLAR AUGMENTED WIND POWER STATION

[76] Inventor: Stephen R. Snook, P.O. Box 846, Port Hueneme, Calif.

[21] Appl. No.: 330,238

[22] Filed: Dec. 14, 1981

Related U.S. Application Data

[63] Continuation-in-part of Ser. No. 113,627, Jan. 21, 1980, abandoned, which is a continuation-in-part of Ser. No. 24,159, Mar. 26, 1979, abandoned, which is a continuation of Ser. No. 870,336, Jan. 18, 1978, abandoned.

[51] Int. Cl.$^3$ .............................................. F03G 7/02
[52] U.S. Cl. .............................. 60/641.14; 60/641.8; 60/641.12; 60/398
[58] Field of Search ............... 60/398, 641.1, 641.5, 60/641.6, 641.8, 641.11, 641.12, 641.13, 641.14

[56] References Cited

U.S. PATENT DOCUMENTS 3,894,393  7/1975  Carlson ............................. 60/641.11
4,367,627  1/1983  Pretini ............................... 60/641.12

FOREIGN PATENT DOCUMENTS 1590838  5/1970  France .

Primary Examiner—Allen M. Ostrager
Attorney, Agent, or Firm—William W. Haefliger

[57] ABSTRACT

A canopy extends over a canyon to provide an air channel with a lower entrance inlet and an upper discharge outlet. Sunlight passes through the canopy to effect heating of the air in the channel and airflow toward the upper outlet. A wind turbine may be driven by the discharging airflow.

70 Claims, 16 Drawing Figures

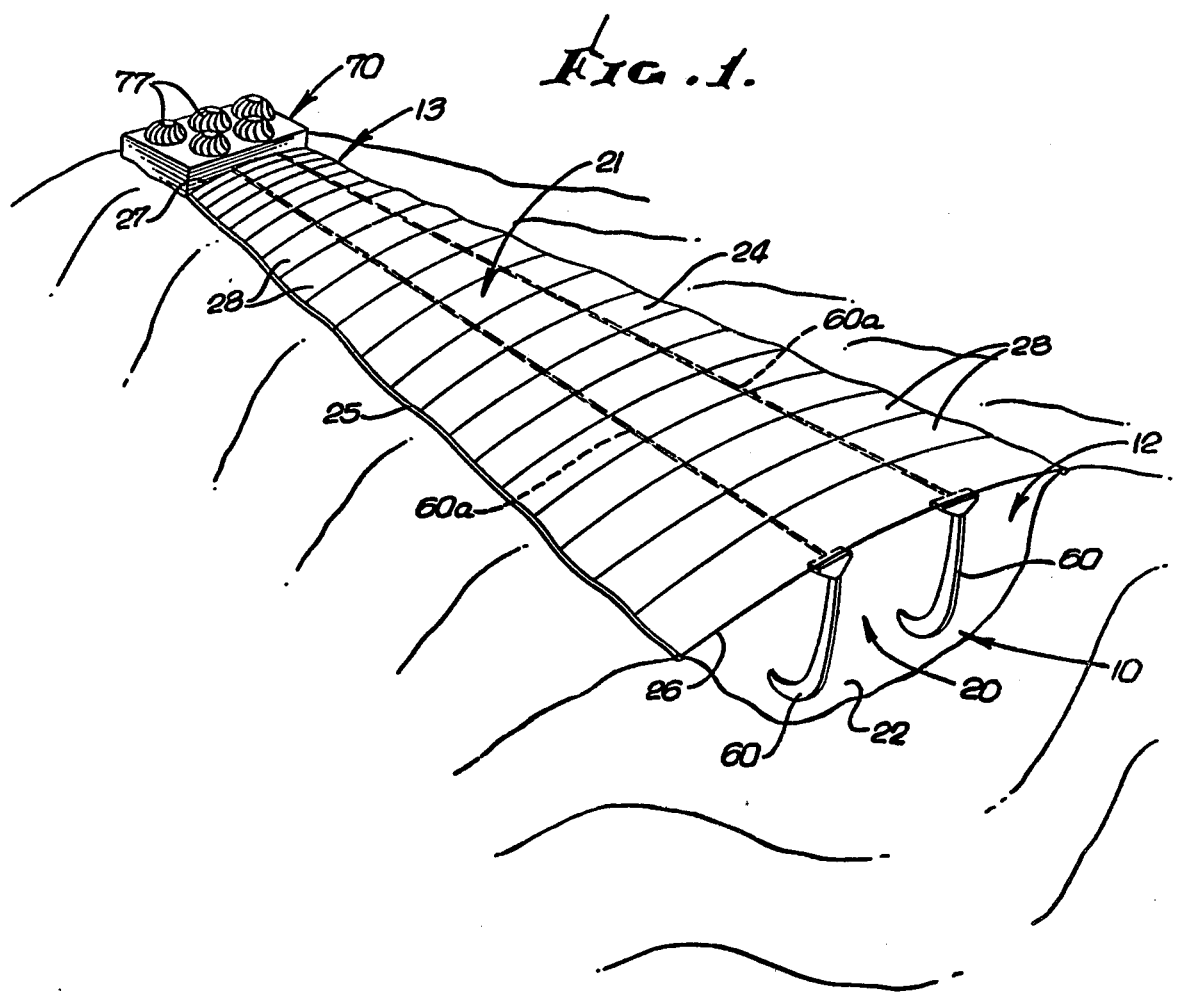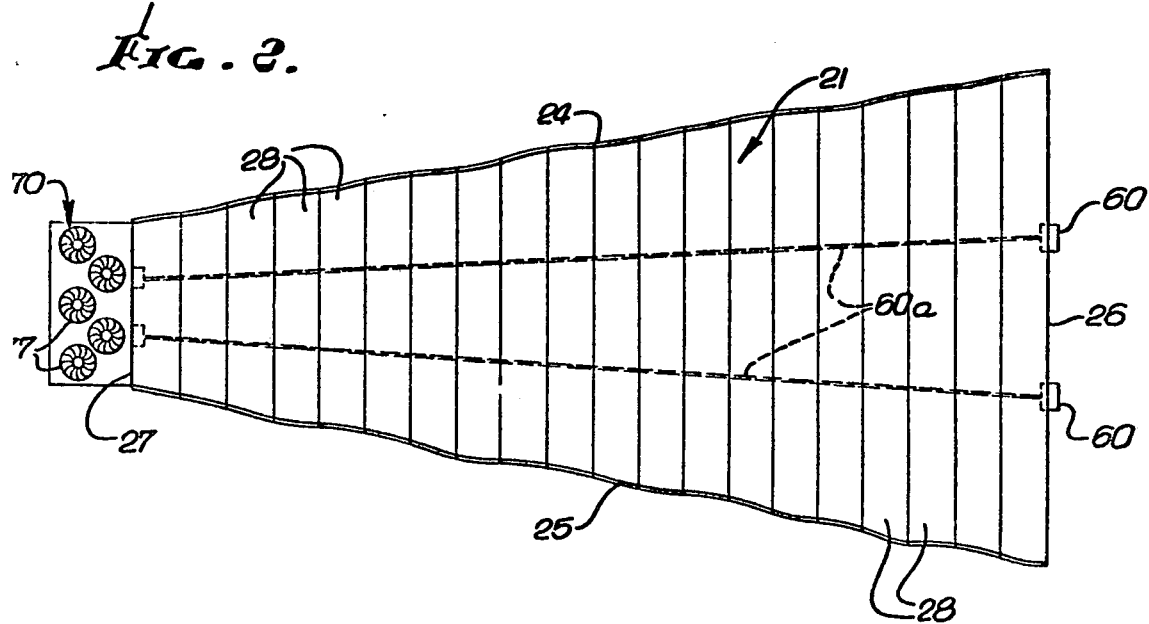

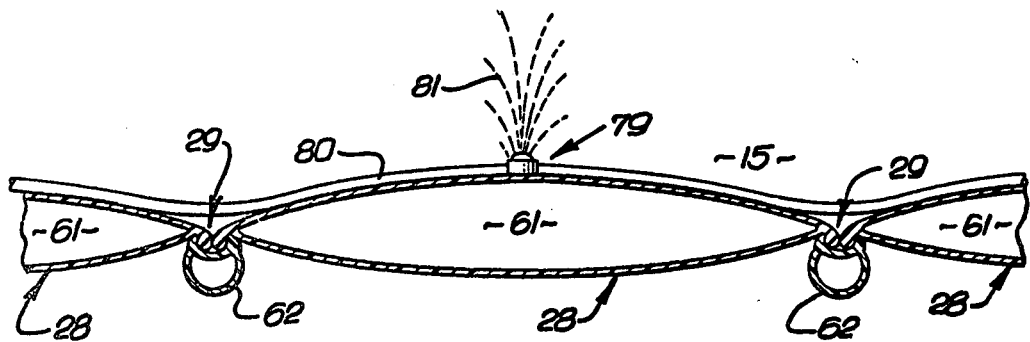
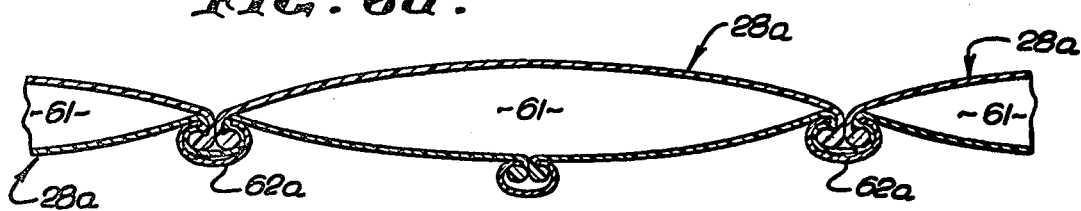
Fig. 6a.
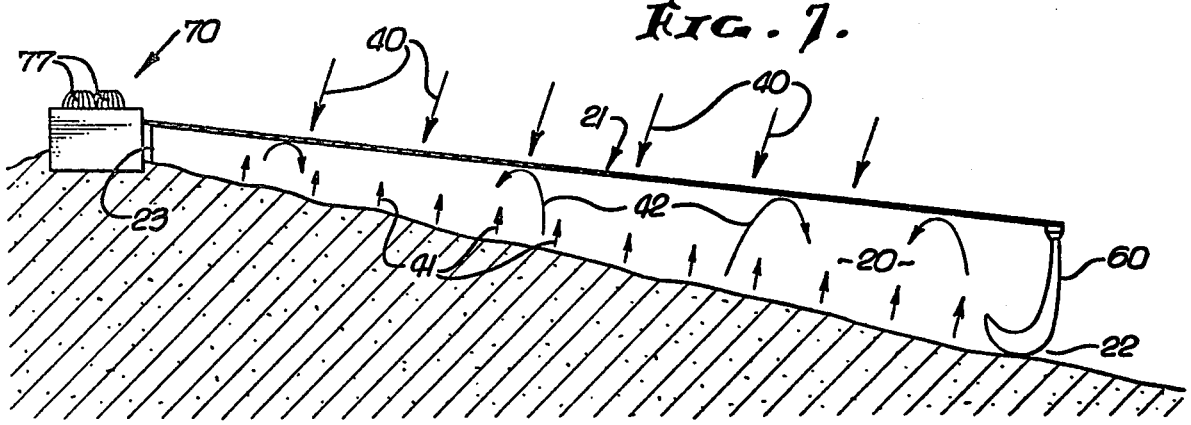
Fig. 7.
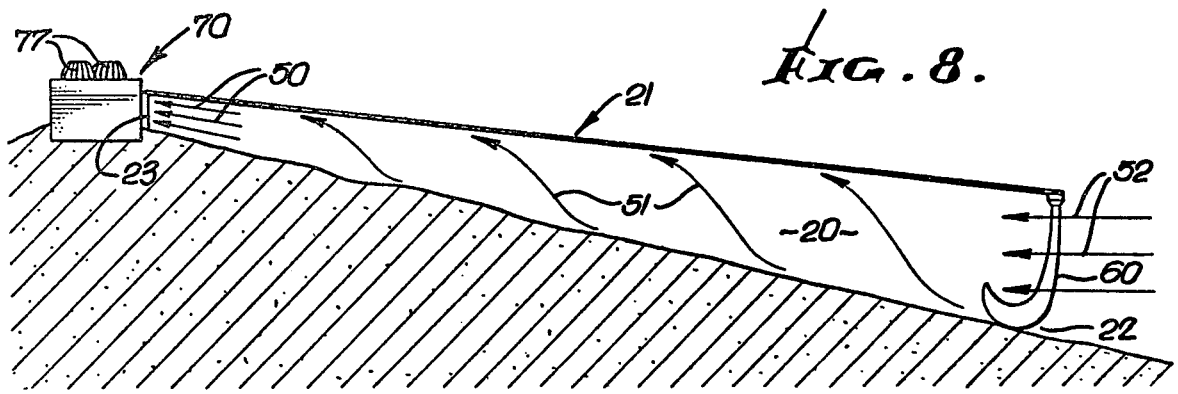
Fig. 8.

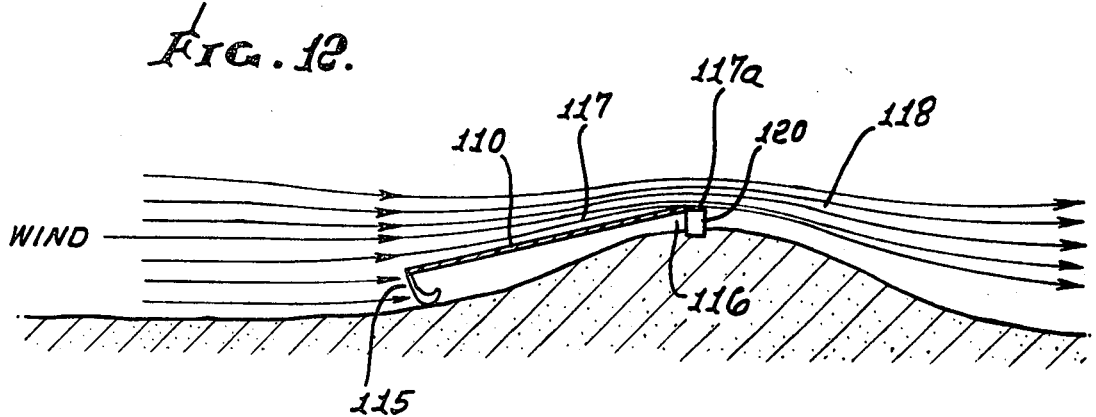
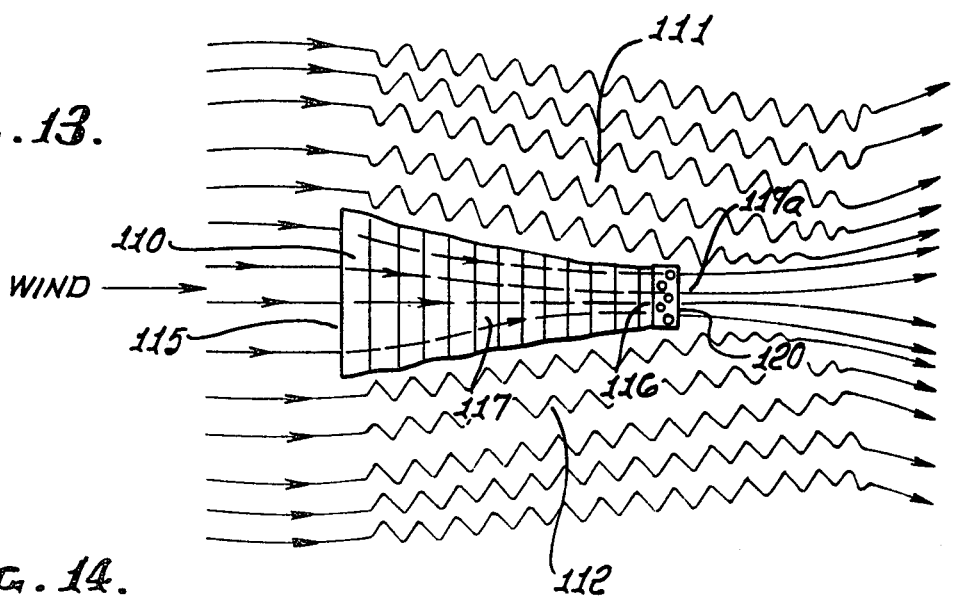
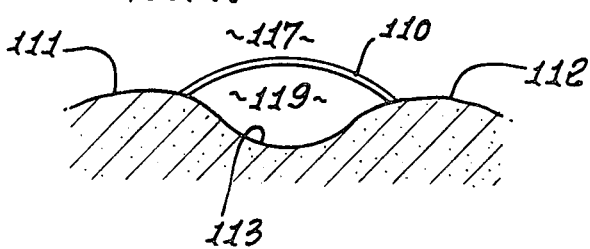
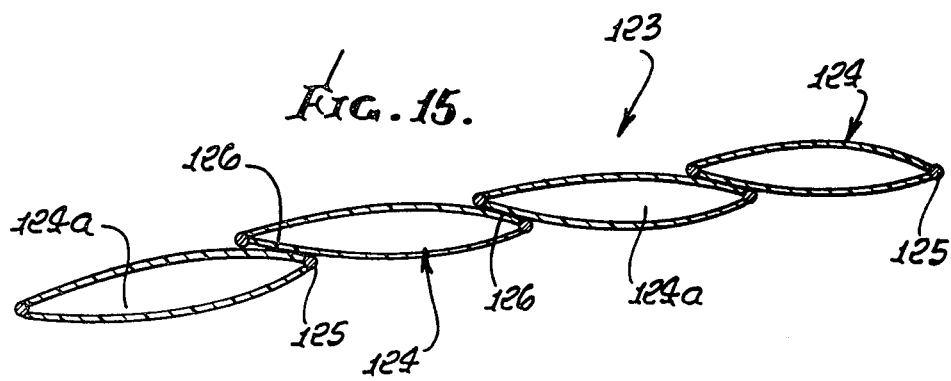

SOLAR CANOPY AND SOLAR AUGMENTED WIND POWER STATION

BACKGROUND OF THE INVENTION

This application is a continuation-in-part of application Ser. No. 113,627, filed Jan. 21, 1980, which was a continuation-in-part of Ser. No. 24,159, filed Mar. 26, 1979, which was a continuation of Ser. No. 870,336, filed Jan. 18, 1978 all now abandoned.

This invention relates generally to the utilization of solar radiation to generate or augment natural wind, which is then used to generate electricity, and more particularly concerns the provision of a solar radiation transmissive cover or canopy for placement over a natural canyon to trap and direct solar-generated thermally convective air currents as well as the prevailing natural wind through a set of wind turbines powering electrical generators situated at or near the nead of the canyon.

Prior systems for generating electricity have included the use of fuels, nuclear energy, windmills and the like. Generally these systems have produced ecologically harmful wastes, or were economically inefficient, or inadequate for large scale energy production. Prior uses of solar energy have included heating and electricity production utilizing photoelectric cells. To my knowledge, no way was known to utilize the sun's radiation energy combined with wind on a large scale to generate electricity in an economically efficient manner, prior to the present invention.

SUMMARY OF THE INVENTION

It is a major object of the invention to provide new and useful means for generating electricity with minimal generating costs and without consuming depletable resources. Basically, the invention comprises a solar radiation transparent canopy extending over a portion of natural canyon so that a longitudinally elongated duct is formed for channeling airflow from a relatively large opening at a lower portion of the canyon to a relatively smaller opening at an upper portion of the canyon.

The internal energy of the air may come from heating within the canyon or it may be the result of heating elsewhere.

This funnelling effect tends to cause the airflow to accelerate, converting some of its internal energy into velocity and enabling the use of fewer and much smaller turbines than would otherwise be required to obtain the same power output from natural wind flow alone. The transparent aspect of the canopy allows solar radiation to pass through the canopy into the canyon, such radiation then heating the canyon walls which in turn heat the enclosed air. The heated air, being of lesser density, flows generally upwardly, and more dense, cooler air enters the duct at its lower opening. The duct then serves to channel this upwardly flowing air to the smaller, upper opening where it may pass through air turbines in communication with electrical generators, thus generating electricity.

Since the invention does not utilize consumable fuels, it is highly inexpensive in daily operation. Also, polluting by-products are eliminated by this power generation system, and the invention allows a reduction in the number of fuel consuming power production plants required in a given area as peak wind and solar inputs tend to coincide with midday periods of peak power consumption. Many other objects and advantages of the invention will be understood from the following drawing and description in which:

DRAWING DESCRIPTION

FIG. 1 is an elevation in perspective of a canyon and one preferred embodiment of the canopy of the invention;

FIG. 2 is a top plan view of a portion of the canopy;

FIG. 6 is an enlarged vertical section taken on lines 6—6 of FIG. 4; and FIG. 6a shows a modification, similar to FIG. 6;

FIG. 7 is an elevation taken in section, lengthwise of the FIG. 1 canyon;

FIG. 8 is another view like FIG. 7;

FIG. 12 is a side elevation taken in section to show wind flow over a canopy embodying the invention;

FIG. 13 is a plan view of the FIG. 4 canopy to show wind flow at opposite outer sides of the canopy and adjacent areas of the canyon;

FIG. 14 is cross section through a canyon and canopy; and

FIG. 15 is a side elevation showing a lenticular canopy arrangement.

DETAILED DESCRIPTION

Figure 3:
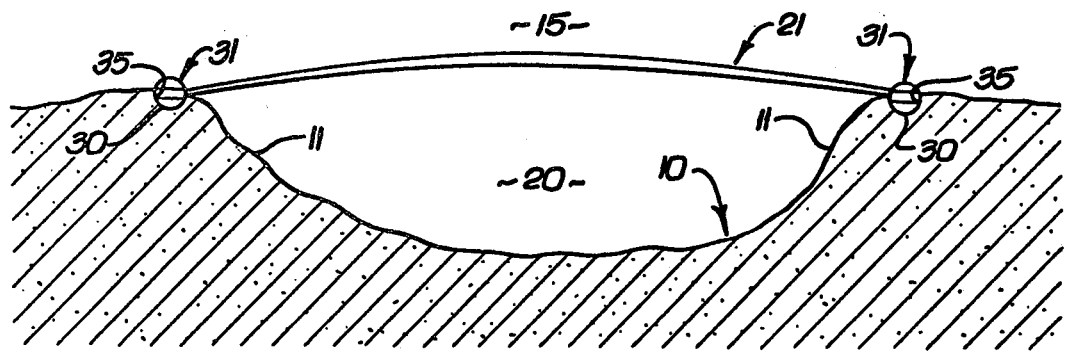
FIG. 3 is a vertical section across the canyon and canopy of FIG. 1.
Figure 4:
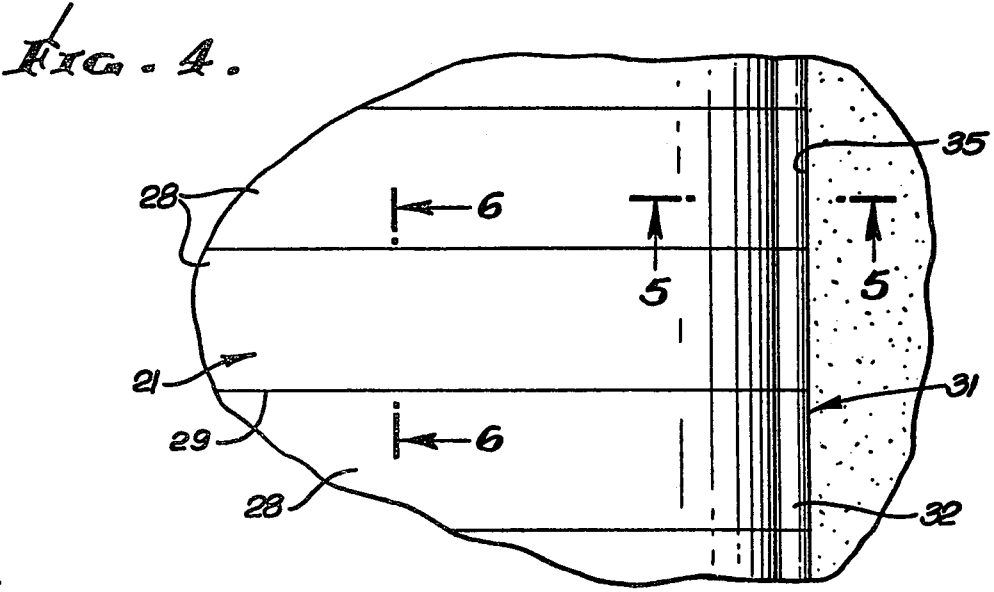
FIG. 4 is an enlarged top plan view of an edge of the FIG. 1 canopy attached to the canyon wall.

FIG. 1 shows one typical form of the invention as it would appear when in use. A canopy 21 extends transversely and lengthwise over a substantial portion of a canyon 10 to form, in combination with the canopy, a longitudinally elongated duct 20 having a relatively large entrance opening 22 at a lower portion 12 of the canyon and a relatively smaller exit opening 23 at an upper portion 13 of the canyon. The word "canyon" is used in a broad sense to cover natural or man-made depressions, cuts, etc. In this embodiment, the canopy 21 has a generally trapezoidal shape, with the first 24 and second 25 opposite edges of the canopy, corresponding to the non-parallel converging sides of the trapezoid, being each elongated and adapted to conform to the topography of the opposite side walls 11 of the canyon 10. Such opposite edges may advantageously form substantially air tight seals 30 at the canyon walls.

Figure 5:
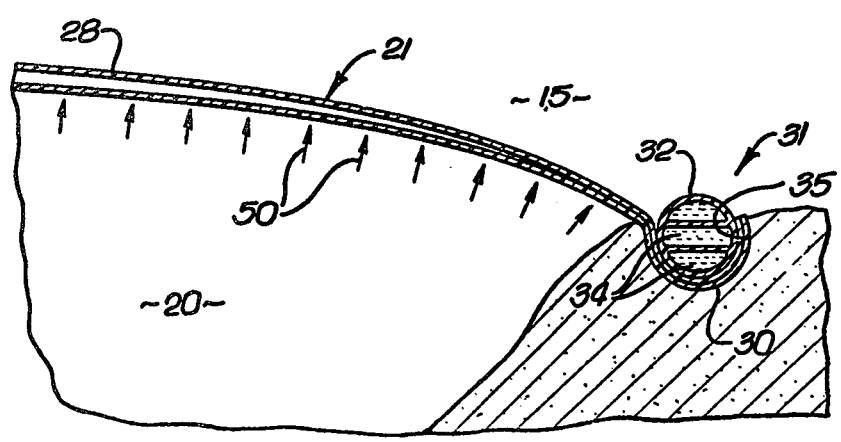
FIG. 5 is an enlarged section on lines 5—5 of FIG. 4.
Figure 9:
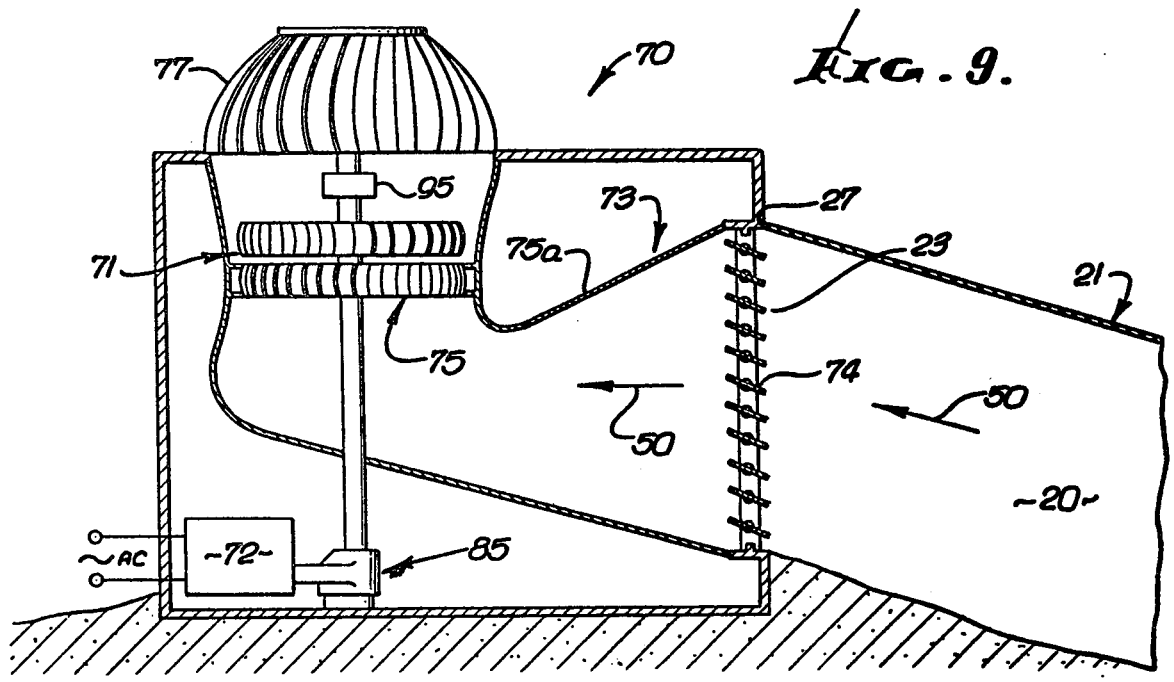
FIG. 9 is an enlarged side elevation, partly in section, through the power generating means of FIG. 1.
Figure 10:
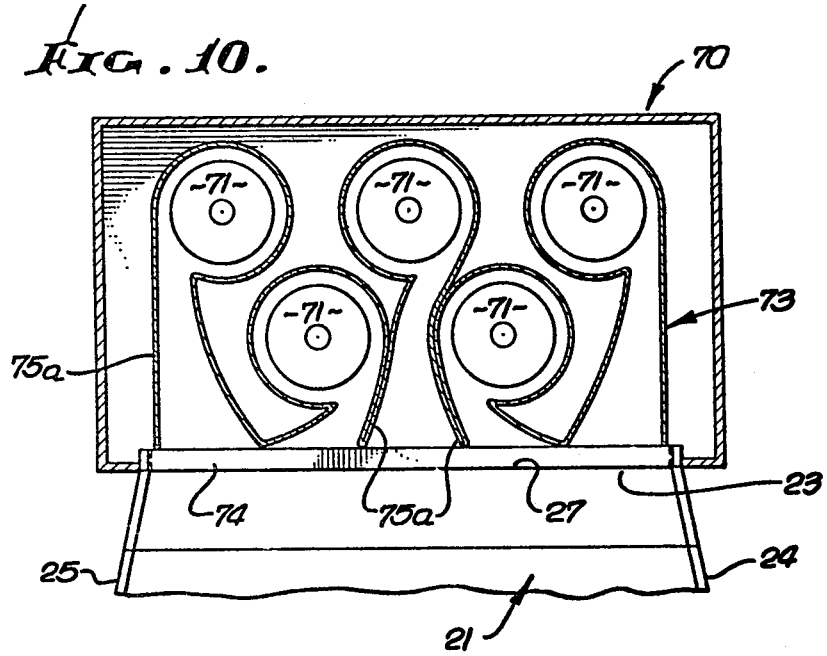
FIG. 10 is a top plan view of the power generating means of FIG. 9.

FIG. 5 shows a typical attachment means 31 in cross section. It comprises a generally tubular chamber 32 connected with the edge of the canopy 21, with interior partitioning walls forming a series of spaced chambers 34 for containing water, sand, concrete or other pourable material. A trough 35 is formed in the canyon wall 11 corresponding to and adapted to receive the tubular chamber 32, such that a flexible, moldable, load retentive, and substantially air tight seal 30 is formed between the typically water filled tubular chamber 32 and the trough 35. Heated air is retained within and channeled by the duct 20 thus formed. Tubes 30 may consist of rubber, plastic, or other natural or synthetic materials which will substantially retain the filling material selected.

Edge 26 of the canopy 21, corresponding to the longer of the two parallel edges of a trapezoid, extends between the described first 24 and second 25 edges of the canopy. Edge 26, in combination with the canyon 10, forms the larger, lower entrance opening 22 of the duct as shown in FIG. 1.

The fourth edge 27 of the canopy 21 extends between the first and second edges 24 and 25 and of corresponding to the shorter of the two parallel edges of a trapezoid, in combination with the canyon 10, forms the smaller, upper exit opening 23 of the duct 20 and serves to channel the flow of heated air 50 generated in the duct 20 into the power generating means 70 in FIG. 1.

The canopy itself 21 is preferably formed of substantially transparent material to pass solar radiation, and may be constructed of modular sheets or panels 28. The latter may be interconnected by attachment means 29 to facilitate repair or replacement of damaged portions of the canopy. The panels 28 may each be formed of two like sheets of plastic sheet material spaced apart as shown in FIG. 6 to provide dead air space 61 insulating the duct 20 from the surrounding air of the environment 15. A typical sheet consists of TEDLAR, or other sheet plastic or glass fiber reinforced plastic (KALWALL, SUN-LITE, etc.). Other materials of like nature (lightweight, flexible) could be used, as for example a thin metal foil, although the latter might be environmentally unacceptable. FIG. 6a is like FIG. 6 but shows replaceable panels 28a removably assembled, as shown, by clips 62a.

Referring to FIG. 8, the prevailing wind (52) is channelled from the lower entrance opening 22 and accelerated by the convergence of the duct (20) into power generating means 70 located proximate to the upper end of the duct 23 at or near the head of the canyon 10. Said acceleration tends to convert some of the internal energy of the air into increased velocity, as well as reducing the cross-sectional area of the power generating means 70 for a given power output, thereby allowing the use of fewer and smaller turbines 71 in the generating process.

Referring to FIG. 7, the canopy 21 passes solar radiation 40 into the canyon and substantially reflects (at 42) and retains within the duct and canyon 20 radiation reflected at 41 by the canyon walls and bottom. The radiation heated canyon walls impart heat to the surrounding air within the duct 20 to generate the airflow 50 or convection at 51 in FIG. 8. Typically, the heated, less dense air 50 rises from the canyon walls 11 generally upwardly toward the smaller exit opening 23 of the duct 20, and is replaced by the colder, more dense air 52 entering the duct 20 at the lower entrance opening 22. The duct 20 serves to channel the heated air 50 into the power generating means 70 located proximate the upper end of the duct 23, at or near the head of the canyon 14. Similarly, as explained above, wind action alone may provide the airflow necessary for power generation with this invention, or solar heating effects may combine with the natural wind to enhance airflow up the canyon.

Several means are provided which either independently, or together, retain the canopy in a suspended condition with respect to the canyon 10. These include the use of lightweight plastic material for the canopy such that the low density enclosed air 50 will suspend the canopy similar to elevation of a hot air balloon. The previously described water filled tube portion 32 and trough 35 edge attachment means to FIG. 5 also serve to anchor and retain the canopy 21 and integral cables 90 in a stretched and thereby suspended condition. Pylon and cable structure may be provided, with rocker pylons 60 at the lower opening 22, and longitudinal cables 60a running lengthwise of the canyon, as shown in FIG. 1, to retain the canopy proximate the opening in a suspended condition. The pocket at cell 61 between sheets of panel material can be filled with lighter than air gas, i.e. Helium, or pressurized with air, to stiffen the cells and thereby provide additional structural support for the canopy. Finally, additional inflatable tubular portions 62 can be provided proximate junctions 29, and inflated, to provide structural support for the canopy.

As shown in FIG. 6, cleaning means 79 may be provided to wash down and maintain the canopy in a substantially transparent condition. Such means typically incorporate hoses 80 extending over the canopy to spray water at 81 over the exposed surface, similar to a garden soaker hose. Hoses 80 run longitudinally of the canyon, while cells 61 extend laterally.

As shown in FIGS. 1, and 7-10, power generating means 70 may be provided to be driven by the force of the air flow 50 generated and channelled by the duct 20. Typically, multiple air turbines 71 are coupled at 85 with electrical generators 72 to generate electricity in response to the flow of heated air 50 therethrough. In order for the air turbines to provide optimum power generation, certain included features are described as follows:

First, additional means 73 to channel the heated airflow 50 from the smaller, upper opening 23 of the duct 20 to each of the air turbines 71, as described, may include shutterlike structure 74. The latter controls airflow 50 into and between multiple air turbines 71 such that each turbine that is on line at a given time, in proportion to the total airflow through the duct, receives airflow sufficient to maintain its optimum power production and efficiency speed. A set of variable inlet guide vanes 75 are the major means of governing turbine speed. The vanes are varied from closed, which cuts off all airflow through the turbine, to part open, which tends to deflect the air against the turbine blades to maximize momentum transfer to full open, which allows maximum airflow through the turbine, to a slight reverse position which tends to brake the turbine somewhat to prevent overspeed conditions.

Second, involutes or scrolls 75a are provided at each air turbine 71 to converge the air to ensure maximum transfer of momentum from the airstream to the turbines. The scrolls rotate the air in the same direction as turbine rotation. In operation, air from the scroll inlet is turned by the scroll toward the turbine to rotate same. A diffusing extractor section 75b, which causes a pressure recovery in the exhaust stream, thereby increasing the pressure differential across the turbine, is located beyond or above the turbine. A boundary layer control system 76 controls and reduces turbulence within the duct. System 76 includes nozzles 76a controllably admitting pressurized gas such as air from manifold 76b to the inner side of extractor section 75b. Pump 76c supplies air to manifold 76b.

A secondary turbine 77 may be located atop the powerhouse, and resembles the extractor-ventilator turbines often seen atop buildings. It enables the recovery of energy both from the primary airstream and during those conditions, such as strong non-prevailing or nocturnal winds, when the primary system may not be operating at its rated output. As importantly, it also serves to break up and begin diffusing the strong vertical airflow from the primary turbine. In addition, surface winds may cause the secondary turbine to rotate and function like the extractor it resembles, thereby reducing the pressure above the primary turbine and increasing primary airflow and efficiency. The secondary turbine may drive a second generator, or it may be geared to the primary generator through an appropriate system of differentials and one-way clutches, as at 95.

The rotation of the main turbine final stage, or secondary turbine, must be opposite that of the primary turbine in order to maximize momentum transfer from the airstream to the secondary turbine. In this design the directions of rotation of the secondary turbines are alternated, so the vortices exiting the station will tend to combine destructively rather than combining into a single large vortex which might be undesirable. In addition, consideration is given to assuring that any net imbalance of vortices will be in a clockwise, or anticyclonic direction to minimize the risk that a vortex from the station could grow into a tornadolike phenomenom.

Figure 11:
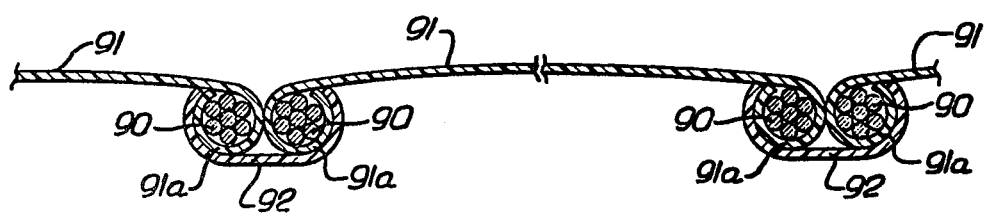
FIG. 11 is a view like FIG. 6, showing a modification.

FIG. 11 is a section through an auxiliary support system of cables 90 for transparent plastic canopy panels 91. The cables extend transversely across the canyon, and are anchored to the canyon walls. The canopy panels 91 have end portions 91a wrapped about the cables, and held together by extended plastic retainers 92 which are C-shaped in cross section, as shown. This construction allows replacement of a panel at any location in the canopy, without interrupting the operation of the power plant.

The solar covering should be anti-reflective of incoming energy; that is, it permits most of the energy to pass through rather than reflecting a portion back towards the sky. Also, an ideal covering does not permit energy to pass back out from the collector to the sky. Fortunately, the earth radiates energy of a much longer wavelength than the sun, the difference being due to the temperature of the radiating body, so it is possible to make a cover or a coating for a cover which allows solar radiation to pass through it, but blocks re-radiation by the earth. This is the so-called "Greenhouse Effect". Further, a solar cover should not be susceptible to "misting" since this could cut transmission significantly, as it does on eyeglasses when one comes from the cold into a warm moist area, or as it does on the bathroom mirror during a good hot shower. Misting is easily controlled with a coating called "Sun Clear" produced by Solar Sunstill Inc., Setauket, N.Y. Also, Du Pont's "Tedlar" PVF film is inherently free of misting. Other available materials are "Sun-Lite" fiberglass reinforced plastic sheet manufactured by the Kalwall Corporation of Manchester, N.H.

In FIGS. 12–14, a canopy 110, of the type described above, extends over and lengthwise upwardly along a canyon formed by ridge walls 111 and 112, and floor 113. At the canopy relatively larger entrance 115, the air-flow has the highest pressure and lowest velocity, characterized as having a "stagnation". At the canopy relatively smaller exit 116, the air-flow has the highest velocity and lowest pressure. Note in FIG. 13 that the canopy converges toward exit 116.

The canopy and ridge walls 111 and 112 also form an open venturi 117 above and lengthwise of the canyon and canopy, that venturi coverging toward a region 117a proximate the smaller opening or exit 116 at the ridgeline upper portion of the formation. Accordingly, air is caused to flow over the ridgeline with increased velocity and reduced pressure, above the channel and toward region 118. Such flow is promoted or enhanced by the smooth upper surface of the canopy, presented toward the channel 117, whereas the adjacent surfaces are relatively rough, due to vegetation, rocks, etc. As a result, the flow lines converge toward the area above the canopy, as indicated in FIG. 13. The canopy 110 comprises one form of means extending over a canyon to form an elongated airflow duct from a higher pressure area near its inlet to a lower pressure area near its exit, said lower pressure area being a result of the vertical venturi means formed above said canopy means by the combination of said canopy means and a sloping formation of the earth (a ridge) which includes said canyon and the horizontal venturi means formed by the dynamic interaction of the airflow over said smoother canopy means in combination with the airflow over the relatively rougher surfaces proximate said smoother means.

Power generating means is shown at 120, proximate exit 116, and driven by the airflow from the duct 119 below the canopy. Such airflow discharges to the reduced pressure region created at 117a (as described above) whereby backpressure is reduced, and efficiency of the power generating means is enhanced. Such power generating means may take the form of that described above, as for example is shown in FIG. 9.

In the above, and as illustrated in FIGS. 12 and 13, both vertical and horizontal flow convergence is afforded.

When the direction of wind flow is reversed, the canopy and the external "venturi" it forms function as a divergent duct with the same consequent effects of a reduced pressure area at the "throat" and a relatively higher stagnation pressure near opening 115. Air is ducted through the channel formed by the combination of canyon and canopy from the relatively higher pressure area near opening 115 to the relatively lower pressure at the "throat" (117a and 118) thereby turning the turbines in the powerhouse 120. This ducting also serves to remove the boundary layer from over the canopy and thereby reduce turbulence.

FIG. 15 shows an alternative design canopy 123 comprised of separate cells 124 generally of a cylindrical or lenticular shape, which may be inflated at 124a with air or helium. Such cells extend laterally over the canyon, and are tethered by lateral cables 125 so that the cells overlap at 126. The use of separate cells limits or eliminates the buildup of precipitate on the canopy, thereby reducing the loads which it must be designed to withstand. Rain or snow buildup will cause a deflection of the cells and their overlap zones, which will allow the accumulation to pass between the cells. The arrangement illustrated tends to seal more tightly as the wind speed within the canyon increases.

From the above, it will be seen the canopy and canyon ridge formation form an open "venturi" above and lengthwise of the canyon and canopy, said venturi converging horizontally toward a region proximate said smaller opening at the upper portion of the canyon, whereby air is caused to flow in said channel with increased velocity and reduced pressure above the canopy and toward said region, by virtue of the canopy having a relatively smooth upper surface presented toward the airflow in said channel, and the ridge formation proximate the canopy having a relatively rough surface presented toward the airflow which rough surface tends to slow said airflow and thereby increase local pressure over said rough surface relative to the local pressure over said smoother surface, thereby inducing flow from the rougher surface towards said smoother surface.

The invention herein provided is not limited to the illustrative embodiments described, rather, the scope and specifications of the invention are more clearly defined as follows.

I claim:

1. In combination with a canyon, an apparatus for converting solar radiation to airflow comprising
   (a) a canopy extending over said canyon to form a longitudinally elongated duct for channeling airflow from a relatively larger opening at a lower portion of the canyon to a relatively smaller opening at an upper portion of the canyon,
   (b) said canopy being substantially transparent to solar radiation passage through the canopy for impinging on the canyon thereby heating the canyon walls,
   (c) the canyon walls serving to impart heat to the air proximate the canyon walls and located within said duct,
   (d) the heated air, being of lesser density, flowing generally toward said upper opening and colder, more dense air entering the duct at the lower opening, said heated air being channeled by said duct in its flow to the smaller opening where it is emitted,
   (e) said cooler air entering the duct at the lower opening then being heated by the canyon walls to flow upward to the smaller opening, generating a continuous flow within said duct.

2. The combination of claim 1 wherein said canopy includes structure which thermally insulates and isolates heated air within said duct from surrounding air.

3. The combination of claim 1 wherein the canopy includes multiple panels comprised of substantially transparent sheets of material.

4. The combination of claim 3 wherein at least one of said panels includes two sheets of plastic material forming insulating space therebetween.

5. The combination of claim 1 wherein said canopy includes a layer of material that allows solar radiation to pass therethrough, into the canyon, and that reflects and retains within the canyon radiation emitted and reflected by the walls of said canyon.

6. The combination of claim 1 wherein said canopy is substantially trapezoidal, defining four edges, wherein
   (a) the first and second opposite edges, substantially corresponding to the non-parallel converging sides of a trapezoid, are each sufficiently elongated and adapted to conform to the topography of and attachable to the respective side wall of the canyon to form a substantially air tight seal between the edge of the canopy and the respective canyon walls, defining said duct,
   (b) the third canopy edge extends between said first and second canopy edges, corresponding to the longer of the two substantially parallel edges of the trapezoid and, in combination with the canyon, forms the larger, lower opening of the duct formed by the canopy and the canyon, and
   (c) the fourth canopy edge extends between said first and second canopy edges, corresponding to the shorter of the two substantially parallel edges of the trapezoid, and in combination with the canyon, forms the smaller upper opening of the duct.

7. The combination of claim 6 wherein said first and second edges of the canopy include structure sufficient to form said substantially air tight seals between the canopy edges and the respective canyon walls.

8. The combination of claim 7 wherein said structure includes
   (d) at least one tubular portion, at said edge of the canopy, at least partially formed of sheet material, and forming a chamber to interiorly contain flowable material.

9. The combination of claim 6 wherein said third edge of the canopy is substantially concave toward the duct.

10. The combination of claim 1 wherein said canopy is at least partially supported by said enclosed heated air.

11. The combination of claim 1, wherein the canopy includes multiple inflatable substantially tubular portions serving at least partially to stiffen and retain said canopy in a suspended condition with respect to said canyon.

12. The combination of claim 1 including at least one pylon structure serving to at least partially retain said canopy in a suspended condition with respect to said canyon, the pylon including a rocker, and cable means connected to the pylon.

13. The combination of claim 1 including power generating means driven by the force of the airflow that is channeled by the duct.

14. The combination of claim 13 wherein said means is located to receive the heated airflow emitted from said smaller, upper opening of the duct and to generate power in response thereto.

15. The combination of claim 13 wherein said means includes an electrical generator.

16. The combination of claim 15 wherein said means includes at least one air turbine and electrical generator combination, characterized in that heated airflow within said duct is channeled by said duct generally toward the smaller, upper opening and then is further channeled into said air turbine wherein energy associated with the heated air is imparted to multiple turbine rotor blades causing rotor rotation which in turn causes rotation of the armature of said generator, thus generating electricity.

17. The combination of claim 16 including additional means including shutter structure located to facilitate said further channeling of the heated air from the smaller, upper opening of the canopy into said air turbine.

18. The combination of claim 17 wherein said additional means includes scrolls to control and pre-rotate said flow of heated air into and between multiple air turbines defined by the first named means.

19. The combination of claim 18 wherein said air turbines include variable stators characterized in that heated air channeled into each turbine will have a controlled angle of incidence and a controlled flow serving to facilitate said transference of energy from the heated air to the turbine rotor.

20. The combination of claim 16 including secondary turbine means located to control the flow of the heated air after it has passed through said air turbine to facilitate exhaust of said air into the environment, said secondary turbine means also extracting energy from the flow for power recovery.

21. The combination of claim 20 wherein said power generating means includes air turbine means located to receive air flow from said duct.

22. The combination of claim 21 wherein said power generating means includes scroll means to guide the airflow into said turbine means.

23. The combination of claim 22 wherein said power generating means includes means to recover exhaust stream pressure to increase the pressure differential across the turbine.

24. The combination of claim 23 wherein said means to recover exhaust stream pressure comprises a diffusing extractor section.

25. The combination of claim 24 wherein said extractor section defines a duct of increasing cross sectional area in the direction of airflow through the duct.

26. The combination of claim 25 including means to control air turbulence within said duct.

27. The combination of claim 26 wherein said air turbulence control means includes means to remove the air boundary layer from the inner side of the duct.

28. The combination of claim 27 wherein said means to remove the air boundary layer includes a gas supply system communicating with the inner side of said duct to blow pressurized gas into the duct and adjacent said duct inner side.

29. In combination with a canyon, an apparatus to contain and accelerate airflow comprising a canopy extending over said canyon to form a longitudinally elongated duct for channeling airflow from a relatively larger opening at a lower portion of the canyon to a relatively smaller opening at an upper portion of the canyon.

30. The combination of claim 29 wherein said canopy is transparent to passage of solar radiation therethrough for heating a canyon wall.

31. The combination of claim 29 including means sealing off between canopy edge portions and canyon walls.

32. The combination of claim 29 wherein the canopy is flexible, and is at least partially supported by air rising in said duct.

33. The combination of claim 29 including power generating means driven by airflow from said duct.

34. The combination of claim 29 wherein the canopy is substantially quadrilateral, defining four edges, and wherein:
(a) the first and second opposite edges, substantially corresponding to the non-parallel converging sides of a quadrilateral, are each sufficiently elongated and adapted to conform to the topography of and attachable to the respective side wall of the canyon to form a substantially air tight seal between the edge of the canopy and the respective canyon walls, defining said duct,
(b) the third canopy edge extends between said first and second canopy edges, and in combination with the canyon, forms the larger, lower opening of the duct formed by the canopy and the canyon, and
(c) the fourth canopy edge extends between said first and second canopy edges, and in combination with the canyon, forms the smaller, upper opening of the duct.

35. The combination of claim 29 wherein said canopy includes structure which thermally insulates and isolates heated air within said duct from surrounding air.

36. The combination of claim 29, wherein the canopy includes multiple panels comprised of substantially transparent sheets of material.

37. The combination of claim 36 wherein at least one of said panels includes two sheets of plastic material forming insulating space therebetween.

38. The combination of claim 29 wherein said canopy includes a layer of material that allows solar radiation to pass therethrough, into the canyon, and that reflects and retains within the canyon radiation emitted and reflected by the walls of said canyon.

39. The combination of claim 29 including means for at least partially retaining said canopy in a suspended condition with respect to said canyon.

40. The combination of claim 39 wherein said means includes pylon structure, said pylon structure including a rocker, and cable means connected to the pylon structure.

41. The combination of claim 29 wherein the canopy comprises a series of inflated cells.

42. The combination of claim 41 wherein said cells partly overlap one another and are deflectible to pass accumulations of rain and snow therebetween.

43. The combination of claim 41 including cables tethering the cells.

44. The combination of claim 29 wherein the canopy and canyon ridge formation form an open venturi channel above and lengthwise of the canyon and canopy, and wherein the airflow in said channel converges horizontally and vertically toward a region proximate said smaller opening at the upper portion of the canyon, with increasing velocity and reducing pressure above the canopy and toward said region, and including duct means receiving said airflow and power generating means driven by airflow from said duct means, said airflow discharging to said reduced pressure region.

45. The combination of claim 29 including
(a) turbine means in communication with said duct to be driven by airflow therefrom,
(b) scroll means located to guide airflow into the turbine means,
(c) and means at the downstream side of the turbine means to receive exhaust stream pressure to increase the pressure differential across the turbine means.

46. The combination of claim 45 wherein said means to recover exhaust stream pressure comprises a diffusing extractor section.

47. The combination of claim 46 wherein said extractor section defines a further duct of increasing cross sectional area in the direction of airflow through the duct.

48. The combination of claim 47 including means to control air turbulence within said further duct.

49. The combination of claim 48 wherein said air turbulence control means includes means to remove the air boundary layer from the inner side of the further duct.

50. The combination of claim 49 wherein said means to remove the air boundary layer includes a gas supply system communicating with the inner side of the said further duct to blow pressurized gas into the further duct and adjacent said further duct inner side.

51. The combination of one of claims 29 and 1 including cleaning means to wash down the exposed surface of said canopy.

52. The combination of claim 51 wherein said cleaning means includes at least one hose extending partially over said canopy to distribute water over portions of the surface of said canopy to facilitate maintaining the transparency thereof.

53. The combination of one of claims 29 and 1 wherein the canopy and the canyon ridge formation form an open venturi above and lengthwise of the canyon and canopy, said venturi converging vertically toward a region proximate said smaller opening proximate the ridgeline of the canyon, whereby air is caused to flow in said channel with increasing velocity and reducing pressure above the canopy and toward said region.

54. The combination of one of claims 29 and 1 wherein the canopy and canyon ridge formation form an open venturi channel above and lengthwise of the canyon and canopy, the air flow in said channel coverging horizontally toward a region proximate said smaller opening at the upper portion of the canyon with increasing velocity and reducing pressure above the canopy and toward said region by virtue of the canopy having a relatively smooth upper surface presented toward the airflow in said channel and the natural formation having a relatively rough surface presented toward the airflow, said airflow tending to be slowed by the roughness, thereby increasing local pressure.

55. The combination of one of claims 29 and 1 wherein the canopy and canyon ridge formation form an open venturi above and lengthwise of the canyon and canopy, said venturi converging horizontally toward a region proximate said smaller opening at the upper portion of the canyon, whereby air is caused to flow in said channel with increased velocity and reduced pressure above the canopy and toward said region, by virtue of the canopy having a relatively smooth upper surface presented toward the airflow in said channel, and the ridge formation proximate the canopy having a relatively rough surface presented toward the airflow which rough surface tends to slow said airflow and thereby increase local pressure over said rough surface relative to the local pressure over said smoother surface, thereby inducing flow from the rougher surface towards said smoother surface.

56. The method of employing a canopy and a canyon to channel and accelerate airflow, that includes
 (a) extending the canopy over the canyon to form an elongated duct,
 (b) and providing a relatively larger airflow entrance to said duct proximate a lower portion of the canyon, and a relatively smaller airflow exit from said duct proximate an upper portion of the canyon.

57. The method of claim 56 including passing solar radiation through the canopy for impinging on the canyon, thereby heating a canyon wall, and allowing said wall to impart heat to air proximate said wall.

58. The method of claim 56 including sealing off between canopy edge portions and canyon walls.

59. The method of claim 56 including allowing rising air in the duct to at least partially support the canopy.

60. The method of claim 56 employing airflow from said duct to drive power generating means.

61. The method of claim 60 wherein said power generating means includes air turbine means, and including the step of locating said air turbine means to receive airflow from said duct.

62. The method of claim 56 including the step of periodically washing upwardly exposed surface extent of said canopy.

63. The method of employing a canyon and means to extend over the canyon and lengthwise thereof, that includes
 (a) extending said means over the canyon to form an elongated airflow duct below said means, and an elongated open venturi channel above said means and also above the ridge formation adjacent said means, the airflow in said venturi characterized by an increasing velocity and reduced pressure proximate the ridgeline,
 (b) and providing an enlarged entrance to said duct proximate a lower portion of the canyon, and a relatively smaller airflow exit from said duct proximate an upper portion of the canyon, the airflow in the duct characterized by an increasing velocity toward a region near said duct exit.

64. The method of claim 63 including locating air turbine means to be driven by airflow from one of said duct and channel.

65. The method that includes fairing a canyon with a canopy to form a vertically-converging open venturi in combination with a ridge formation, the airflow over said canopy being characterized by increasing velocity and reduced pressure as it approaches the canyon ridgeline.

66. The combination of claim 65 wherein the canopy comprises a series of inflated cells.

67. The combination of claim 66 wherein said cells partly overlap one another and are deflectible to pass accumulations of rain and snow therebetween.

68. The combination of claim 66 including cables tethering the cells.

69. The combination of one of claims 66–68 wherein the cells are inflated with helium.

70. For combination with a canyon, apparatus for converting solar radiation to airflow comprising
 (a) a canopy sized to extend over said canyon to form a longitudinally elongated duct for channeling airflow from a relatively larger opening at a lower portion of the canyon to a relatively smaller opening at an upper portion of the canyon,
 (b) said canopy being substantially transparent to solar radiation passage through the canopy for impinging on the canyon thereby heating the canyon walls, the canyon walls serving to impart heat to the air proximate the canyon walls and located within said duct, the heated air, being of lesser density, flowing generally toward said upper opening and colder, more dense air entering the duct at the lower opening, said heated air being channeled by said duct in its flow to the smaller opening where it is emitted, said cooler air entering the duct at the lower opening then being heated by the canyon walls, as described, to flow upward to the smaller opening, generating a continuous flow within said duct,
 (c) the canopy being generally trapezoidal, and having opposite edges which substantially correspond to the non-parallel, converging sides of the trapezoid and which are elongated to conform to opposite side wall topography of the canyon,
 (d) the canopy having a third edge to extend over said larger opening, and a fourth edge to extend over said smaller opening.

* * * * *